United States Patent [19]
Davis et al.

[11] 3,922,976
[45] Dec. 2, 1975

[54] SEWAGE TREATMENT SYSTEM

[75] Inventors: Robert B. Davis, New Britain; Alan H. Cornish, Newington, both of Conn.

[73] Assignee: Koehler-Dayton, Inc., New Britain, Conn.

[22] Filed: Nov. 20, 1974

[21] Appl. No.: 525,360

[52] U.S. Cl. .................................. 110/9 R; 4/131
[51] Int. Cl.² ...................... F23G 5/00; F01N 3/02
[58] Field of Search ............ 110/7 R, 7 B, 7 G, 9 R, 110/9 E; 4/131, 10; 60/317

[56] References Cited
UNITED STATES PATENTS

| | | | |
|---|---|---|---|
| 3,721,346 | 3/1973 | Lore et al. | 110/7 X |
| 3,731,490 | 5/1973 | Sargent | 110/7 X |
| 3,831,534 | 8/1974 | Cornish et al. | 110/9 |
| 3,833,943 | 9/1974 | Sturtevant | 110/7 X |

*Primary Examiner*—Kenneth W. Sprague
*Attorney, Agent, or Firm*—Spencer T. Smith

[57] ABSTRACT

A sewage treatment system comprising a collection tank assembly including, means for macerating the collected sewage, and means for pumping the macerated sewage therefrom, means for delivering sewage to the collection tank assembly, sewage combustion means, means for directing a minor portion of the macerated sewage pumped from the collection tank assembly to the sewage combustion means, means for delivering the remaining major portion of the macerated sewage pumped from the collection tank assembly back into the collection tank assembly, and means for energizing the pumping means only when the condition of the combustion means will assure complete combustion of the minor portion of the macerated sewage pumped thereinto.

5 Claims, 2 Drawing Figures

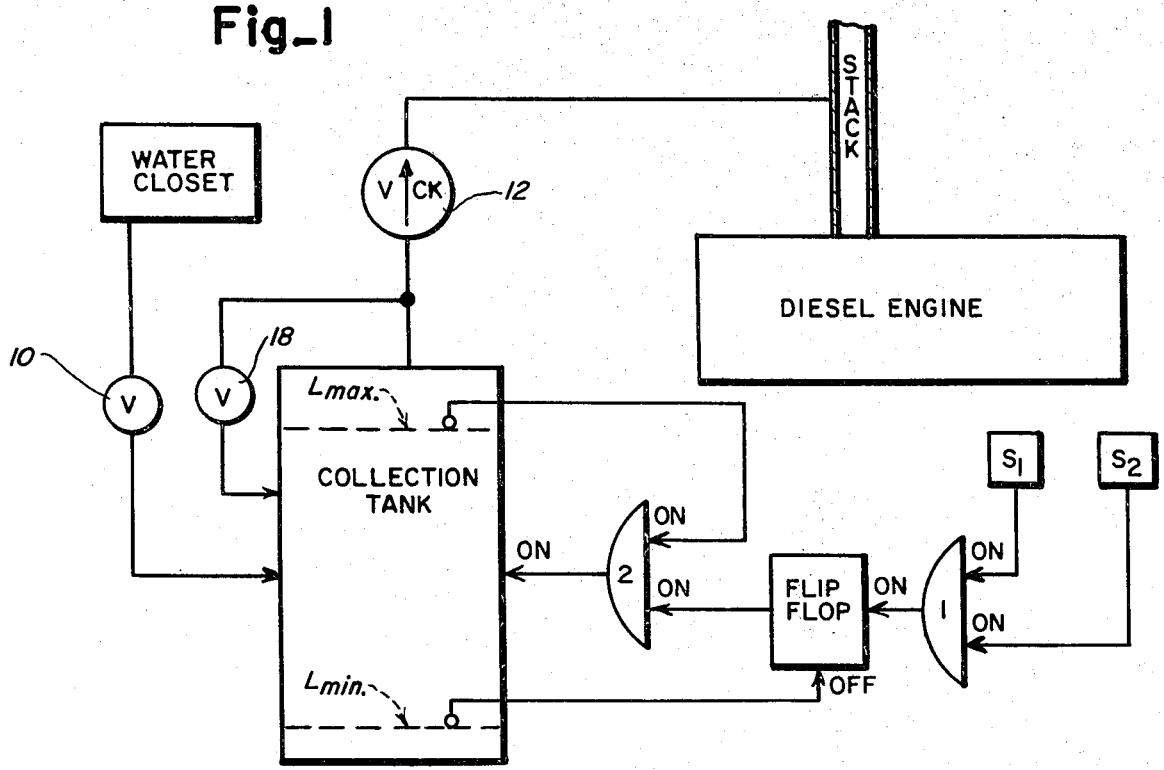
Fig_1
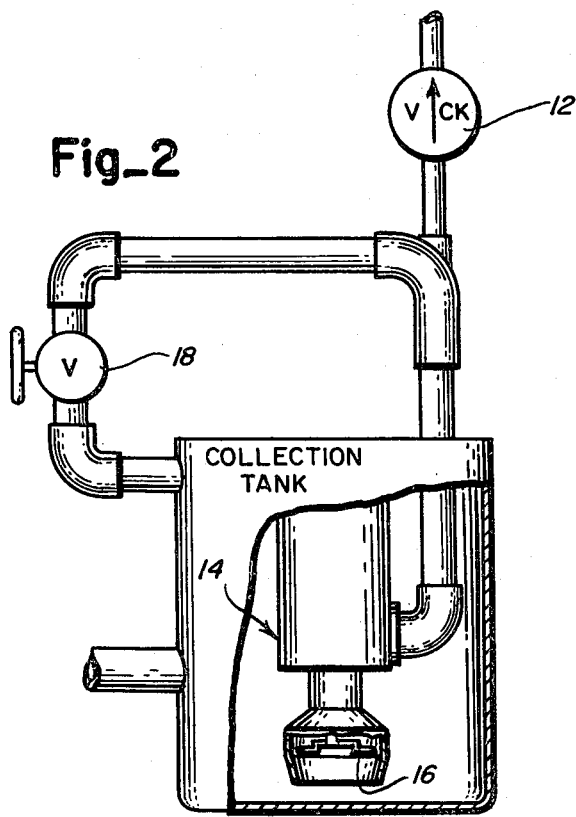
Fig_2

SEWAGE TREATMENT SYSTEM

The present invention relates to sewage treatment systems and more particularly to sewage treatment systems which deliver sewage in the form of a fluid containing macerated solids to an exhaust stack or other combustion chamber for combustive reduction.

Conventionally, the sewage is delivered to the exhaust stack only when the gases in the exhaust stack exceed a predetermined temperature. The solid portion of the sewage must be macerated into very fine particles to assure that combustion of the delivered sewage will be complete so that no solid residue or viable organisms will be discharged from the exhaust stack.

It is, accordingly, an object of the present invention to provide a sewage treatment system wherein the degree of maceration of the sewage during the operation of the system can be greatly increased without changing the macerator which is utilized in the system.

Other objects and advantages of the present invention will become apparent from the following portion of this specification and from the accompanying drawings, which illustrate in accordance with the patent statutes a presently preferred embodiment incorporating the principles of the invention.

REFERRING TO THE DRAWINGS:

FIG. 1 is a diagrammatic illustration of a sewage treatment system made in accordance with the teachings of the present invention; and FIG. 2 is an elevational view, partly in section, of the collection tank assembly illustrated in FIG. 1.

The sewage treatment system includes a water closet which may be a recirculating toilet, wherein the liquid portion of the flushed effluent is selectively recirculated as the flushing medium. If the water closet is a recirculating toilet, it will be periodically drained into a collection tank by momentarily opening a water closet drain valve 10. The collected sewage is then macerated in and pumped from the collection tank through a collection tank check valve 12 into the exhaust stack of a diesel engine or the like, where it will be consumed by the exhaust heat from the diesel engine.

To assure that there will be no residue or odor emitted from the stack, the sewage is delivered to the stack only when the temperature within the exhaust stack at the point of admission of the sewage is at least a predetermined temperature (675°F, for example). In the preferred embodiment, a lube oil pressure switch $S_1$, which senses an elevation in the engine oil pressure indicating that the engine is operating and a throttle open switch $S_2$, which senses an open engine throttle, generate signals, which are supplied to a first AND gate. When these two switches are closed, the temperature within the exhaust stack has been found to exceed the predetermined temperature. The first AND gate is accordingly on and sends an "ON" signal to a bistable FLIP-FLOP, whereby the FLIP-FLOP will be set at a first state and an ON signal will be directed to the second AND gate. When the sewage level in the collection tank reaches a predetermined maximum level $L_{MAX}$, a second ON signal will be supplied to the second AND gate and the collection tank will accordingly be energized. Such energization will continue until the sewage level within the collection tank decreases to a predetermined minimum level $L_{MIN}$, whereupon an OFF signal will be supplied to the FLIP-FLOP to set the FLIP-FLOP at a second state. An ON signal will accordingly be removed from the second AND gate to deenergize the collection tank. Similarly, if either or both of the switches $S_1$, $S_2$ are opened, the collection tank will be deenergized.

The success of the system depends in great measure on the ability to supply the sewage to the combustion zone only when the solid component of the sewage has been macerated into very fine particles. This objective is achieved in the present invention with the utilization of a positive displacement pump 14, which includes a macerator unit 16 and which will discharge the macerated sewage at a flow rate, for example 15 gallons per minute, far in excess of the desired flow rate to the stack. The flow line to the conduit includes a T connector which directs sewage conjointly to the exhaust stack and into a second flow line including a manually controlled valve 18, which communicates with the collection tank. The manual valve is adjusted so that a major portion (90 to 98%) of the discharged sewage will be redirected back into the collection tank. In the preferred embodiment, the flow conduit to the stack has a size (¾ inch), which is smaller than the size of the conduit leading to the manual control valve (1-¼ inches) to permit this percentage to extend to within the desired range of operation. This high flow volume compared to the burn-off quantity allows a high degree of multiple maceration providing excellent particulation of the effluent. The flow rate to the combustion zone can be varied, within the desired range of from 2% to 10% of the output of the macerator pump, by manually changing the setting of the valve 16.

What is claimed is:
1. A sewage treatment system comprising
   a collection tank assembly for collecting sewage including
      means for macerating the collected sewage, and
      means for pumping the macerated sewage therefrom,
   means for delivering sewage to said collection tank assembly,
   sewage combustion means operable at temperatures below and above a predetermined temperature,
   means for directing a selected minor portion of the macerated sewage pumped from said collection tank assembly to said sewage combustion means,
   means for delivering the remaining major portion of the macerated sewage pumped from said collection tank assembly back into said collection tank assembly, and
   means for energizing said pumping means only when the operating temperature exceeds the predetermined temperature.

2. A sewage treatment system according to claim 1, wherein said pumping means includes said macerating means.

3. A sewage treatment system according to claim 1, wherein said delivering means delivers about approximately 90 to 98% of the pumped and macerated sewage back into said collection tank assembly.

4. A sewage treatment system according to claim 1, wherein said major portion can vary between predetermined limits and further comprising means for selectively varying the rate of flow of the pumped and macerated sewage within said limits.

5. A sewage treatment system according to claim 1, wherein said sewage combustion means comprises an exhaust stack of an engine.

* * * * *